United States Patent
Zong et al.

(10) Patent No.: US 8,831,606 B2
(45) Date of Patent: Sep. 9, 2014

(54) MOBILE TERMINAL REGISTRATION METHOD IN A RADIO NETWORK

(75) Inventors: Zaifeng Zong, Shenzhen (CN); Jinguo Zhu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 1270 days.

(21) Appl. No.: 13/818,273

(22) PCT Filed: Dec. 29, 2007

(86) PCT No.: PCT/CN2007/003932
§ 371 (c)(1),
(2), (4) Date: Feb. 21, 2013

(87) PCT Pub. No.: WO2009/009940
PCT Pub. Date: Jan. 22, 2009

(65) Prior Publication Data
US 2013/0203414 A1    Aug. 8, 2013

(30) Foreign Application Priority Data
Jul. 18, 2007  (CN) .......................... 2007 1 0130406

(51) Int. Cl.
*H04W 4/00*  (2009.01)
*H04W 60/00*  (2009.01)
*H04W 8/26*  (2009.01)
*H04W 88/02*  (2009.01)

(52) U.S. Cl.
CPC ............... *H04W 60/00* (2013.01); *H04W 8/26* (2013.01); *H04W 88/02* (2013.01)
USPC ...................... 455/435.1; 455/433; 455/435.2

(58) Field of Classification Search
CPC ... H04W 60/00; H04W 60/005; H04W 72/04; H04W 72/087; H04W 72/042; H04W 74/006; H04W 74/0833; H04W 76/02; H04W 76/021; H04W 76/025; H04W 84/042

USPC ............. 455/426.1, 432.3, 433, 435.1, 435.2, 455/435.3

See application file for complete search history.

(56) References Cited

U.S. PATENT DOCUMENTS

| | | | | |
|---|---|---|---|---|
| 8,452,283 | B2* | 5/2013 | Vikberg et al. | 455/435.1 |
| 2008/0305792 | A1* | 12/2008 | Khetawat et al. | 455/435.1 |
| 2008/0311923 | A1* | 12/2008 | Petrovic et al. | 455/450 |
| 2009/0303971 | A1* | 12/2009 | Kim et al. | 370/338 |
| 2011/0032889 | A1* | 2/2011 | Lee et al. | 370/329 |
| 2013/0250899 | A1* | 9/2013 | Jeong et al. | 370/329 |

FOREIGN PATENT DOCUMENTS

| | | |
|---|---|---|
| CN | 1744761 | 3/2006 |
| CN | 1934891 | 3/2007 |
| CN | 1997208 | 7/2007 |
| WO | 2006031157 | 3/2006 |

OTHER PUBLICATIONS

International Search Report mailed Apr. 24, 2008 in International Application No. PCT/CN2007/003932.

* cited by examiner

*Primary Examiner* — Jean Gelin
(74) *Attorney, Agent, or Firm* — Plumsea Law Group, LLC

(57) ABSTRACT

A mobile terminal registration method in a radio network includes: a. A mobile terminal sending a non-access stratum message and identifier information of last registration to a radio access network unit, and the identifier information comprising the Serving CN Node identifier, Serving CN Node pool identifier and Public Land Mobile Network Identifier; b. If the radio access network unit determines that the identifier information is invalid, the radio access network unit allocating a Serving CN Node to the mobile terminal and sending the non-access stratum message to the Serving CN Node; c. After the Serving CN Node receives the non-access stratum message, if determining that a registration request of mobile terminal can be accepted, the Serving CN Node sending a success response message to the mobile terminal, and the message carrying identifier information of current Serving CN Node; d. The mobile terminal saving the new identifier information.

14 Claims, 4 Drawing Sheets

MOBILE TERMINAL REGISTRATION METHOD IN A RADIO NETWORK

TECHNICAL FIELD

The present invention relates to a mobile terminal registration method, and especially, to a mobile terminal registration method in a radio network.

BACKGROUND OF THE RELATED ART

In the Wideband Code Division Multiple Access (WCDMA) Release 5 (hereinafter referred to as R5) released by the 3GPP, a method for Core Network (CN) nodes jointly managing a group of Radio Network Controllers (RNCs) is described, that is, it is a conception of pool. A core network node pool is defined as that: it is unnecessary to change the area of Serving CN Node when a Mobile Station (MS) roams; one pool is served by one or multiple Serving CN Nodes jointly; and all cells managed by the RNCs belong to the same pool.

In the R5, the Network Resource Identifier (NRI) is used for identifying different Serving CN Nodes. When a mobile terminal registers in a certain pool for the first time, an RNC allocates one Serving CN Node to the mobile terminal according to a load sharing principle, and sends a registration request message of the mobile terminal to the Serving CN Node. After the registration is successful, the Serving CN Node will send an NRI corresponding to the Serving CN Node to the mobile terminal, and the mobile terminal saves the NM.

Each RNC in the pool is configured with a mapping table from the NRI to the IP address of the Serving CN Node. When the mobile terminal sends a Non-Access Stratum (NAS) message again in the pool, the mobile terminal carries the NRI in the message. The RNC searches for the IP address of the Serving CN Node from the configured mapping table according to the NRI, and forwards the NAS message from the mobile terminal to the Serving CN Node.

In the R5, in order to be compatible with the previous releases (R99 and R4), the NRI is planned as a part of Temporary Mobile Subscriber Identifier (TMSI). This limits that the number of users managed by one pool cannot exceed $2^{TMSI}$ at most. Moreover, a part of the TMSI is also used as other management functions, such as a restart symbol of a Visitor Location Register (VLR) and so on, and the number of users actually managed by the pool is less than $2^{TMSI}$. This limits the extension of the pool.

Moreover, in the R5, the mapping table between the NRI and the IP address of the Serving CN Node is configured in the RNC. A configuration workload increases with the increase in the number of RNCs, the configuration workload is a product of the number of RNCs and the number of Serving CN Nodes, and this also limits the extension of the pool.

This routing method in the R5 can still adapt to the requirements of the 3rd Generation (3G) mobile communication system, because the interconnection between the RNC and the Serving CN Node actually has a certain limitation in the 3G network. However, with the constant development of Internet Protocol (IP) evolution, the all IP intercommunication can be implemented between a radio access system and a core network, and the pool can be configured to be extremely large so as to achieve the sharing of more resources, and thus, the current routing method cannot satisfy the requirements any more at this point.

SUMMARY OF THE INVENTION

The technical problem required to be solved by the present document is to provide a mobile terminal registration method in a radio network. With the method, it is not required to manually configure mapping between a Serving CN Node identifier (i.e. a Mobility Management Entity Identifier (MME ID)) and the IP address of a Serving CN Node in a Radio Access Network (RAN) unit, but the RAN unit searches a certain centralization control unit (such as a Domain Name Server (DNS) or a resource management server) to acquire the IP address of the Serving CN Node.

In order to solve the above technical problem, the present document provides a mobile terminal registration method in a radio network, which comprises following steps:

a. A mobile terminal sending a non-access stratum message and identifier information of the last registration to a radio access network unit, and the identifier information comprising a Serving CN Node identifier (i.e. an MME ID), a Serving CN Node pool identifier (Pool ID) and a Public Land Mobile Network Identifier (PLMN ID);

b. If the radio access network unit determines that the identifier information is invalid, the radio access network unit allocating a Serving CN Node to the mobile terminal and sending the non-access stratum message to the Serving CN Node;

c. After the Serving CN Node receives the non-access stratum message, if determining that a registration request of the mobile terminal can be accepted, the Serving CN Node sending a success response message to the mobile terminal, and the message carrying identifier information of a current Serving CN Node which includes an MME ID and a Pool ID, or further includes a PLMN ID; and d. The mobile terminal saving the identifier information in the success response message after receiving the success response message.

Furthermore, in the step a, the non-access stratum message and the identifier information of the mobile terminal are transmitted to the radio access network unit through a radio resource control message between the mobile terminal and the radio access network unit.

Furthermore, in the step b, the identifier information being invalid means that the PLMN ID is valid, and the Pool ID or the MME ID is invalid.

Furthermore, in the step b, the radio access network unit allocating the Serving CN Node to the mobile terminal comprises following steps: the radio access network unit accessing a resource management server corresponding to the Serving CN Node pool according to the PLMN ID requested by the mobile terminal, and the resource management server allocating the Serving CN Node to the terminal.

Furthermore, the radio access network unit accessing the resource management server according to the PLMN ID requested by the mobile terminal comprises following steps: the radio access network unit selecting a corresponding Pool ID according to the PLMN ID requested by the mobile terminal, and generating a domain name of the Serving CN Node pool according to the Pool ID and the PLMN ID, and accessing the resource management server according to the domain name.

Furthermore, the domain name is Pool ID.PLMN ID.

Furthermore, the resource management server allocating the Serving CN Node to the terminal comprises one of following methods:

the radio access network unit sending a non-access stratum message sent from a mobile terminal to the resource management server, the resource management server allocating the Serving CN Node to the mobile terminal according to a load sharing principle, and forwarding the non-access stratum message to the allocated Serving CN Node of the mobile terminal;

or, the radio access network unit requesting the resource management server to allocate the Serving CN Node according to the domain name, and after the resource management server allocates the Serving CN Node to the mobile terminal according to the load sharing principle, the radio access network unit forwarding the non-access stratum message to the Serving CN Node allocated by the resource management server.

Furthermore, the step c further comprises: the Serving CN Node registering to a home subscriber server; and the home subscriber server returning user subscription information to the Serving CN Node.

Furthermore, in the step c, the Serving CN Node decides whether the registration request of the mobile terminal can be accepted according to the user subscription information.

Furthermore, the Serving CN Node is a mobility management entity, and the radio access network unit is an evolved node B.

Furthermore, the identifier information being valid means that the PLMN ID, the Pool ID and the MME ID are all valid; the PLMN ID being valid means that a PLMN ID value is not null, and the radio access network unit belongs to a public land mobile network identified by the PLMN ID; the Pool ID being valid means that a Pool ID value is not null, and the Pool ID of the Serving CN Node pool is a Pool ID of a certain Serving CN Node pool which manages the radio access network unit, and the PLMN ID is identical with the PLMN ID of the Serving CN Node pool corresponding to the Pool ID; the MME ID being valid means that an MME ID value is not null, and the corresponding Pool ID is valid, and the MME ID uniquely corresponds to an MME in the Serving CN Node pool.

Furthermore, if the registration of the mobile terminal is an initial registration of the mobile terminal in the network, the non-access stratum message is an attach request message.

Furthermore, if the registration of the mobile terminal is a registration of the mobile terminal in the network when the mobile terminal performs tracking area update, the non-access stratum message is a tracking area update request message.

Furthermore, when the non-access stratum message is the attach request message, in the step c, the Serving CN Node sends the success response message to the mobile terminal after establishing an IP bearer.

With the mobile terminal registration method in the network composed of multiple radio access network units and multiple Serving CN Nodes provided by the present document, based on an all IP architecture, it can adapt to requirements of the all IP intercommunication between a radio access system and core network nodes. A new parameter is adopted in the present invention, one identifier independent from TMSI is utilized to identify a Serving CN Node in the pool, and a TMSI field is not used as the identifier any more, thus the number of users managed by the pool is not limited. In addition, it can be implemented that it is not required to configure a mapping table in a radio access network unit, and the RAN searches a certain centralization control unit to acquire an IP address of the Serving CN Node, which reduces the workload of the radio access network units and saves system resources.

PREFERRED EMBODIMENTS OF THE PRESENT INVENTION

Figure 1:
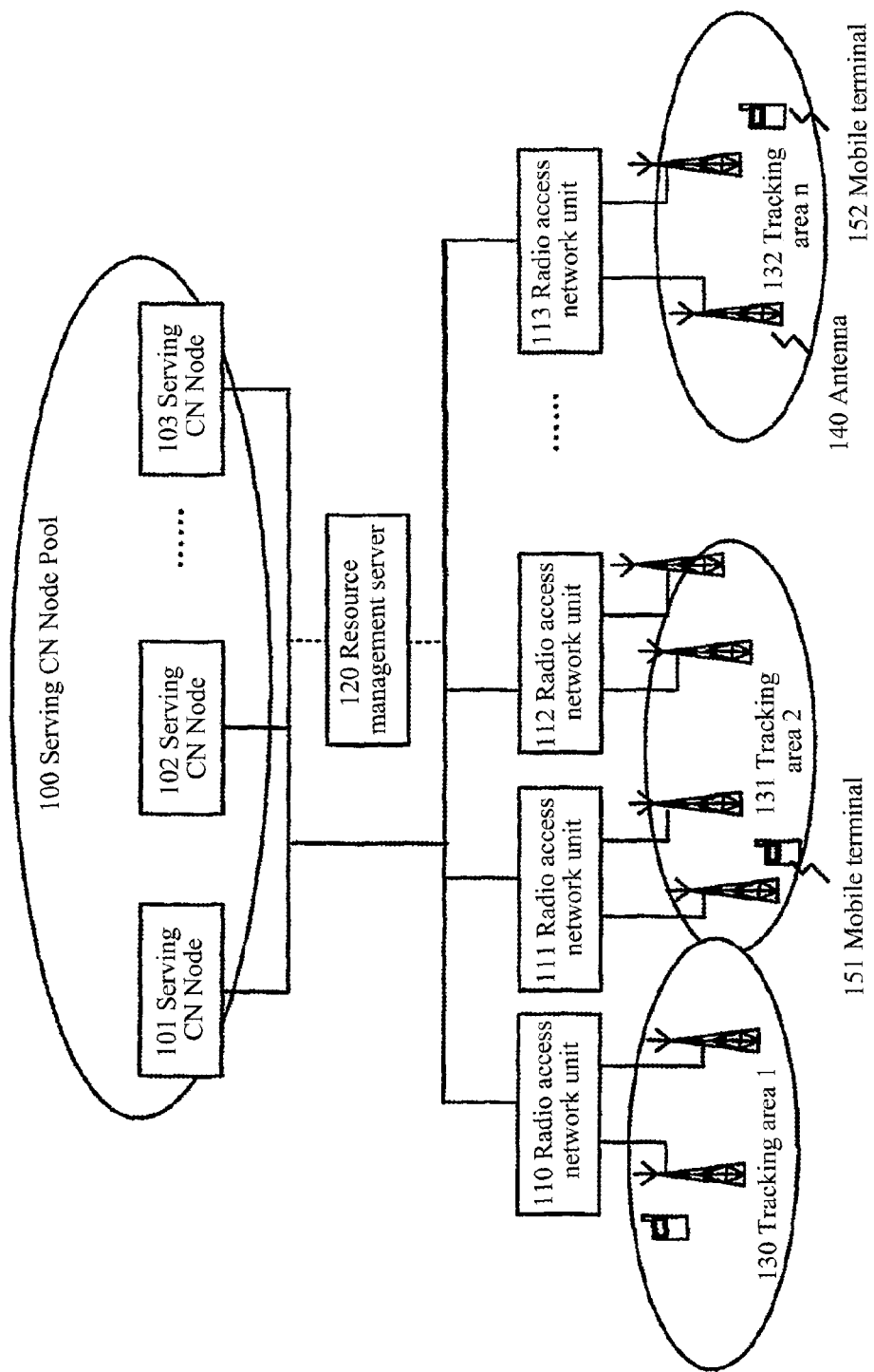
FIG. 1 is a structure chart of networking between multiple radio access network units and multiple core network nodes.

The present invention will be further described in detail in combination with the accompanying drawings and specific examples below.

The following improvements are made with respect to the problems existing in the R5 in the present invention.

Firstly, Serving CN Nodes in one pool are not identified by using a TMSI field any more, but they are identified by using a MME Identifier (MME ID) independent from TMSI.

Secondly, it is not required to manually configure mapping between the MME ID and the IP address of a Serving CN Node in a Radio Access Network (RAN) unit, but the RAN unit searches a certain centralization control unit (such as a Domain Name Server (DNS) or a resource management server) to acquire the IP address of the Serving CN Node.

A global identifier of the Serving CN Node in the present invention is jointly composed of a Public Land Mobile Network Identifier (PLMN ID), a Serving CN Node pool identifier (Pool ID) and a Serving CN Node identifier in the pool (an MME ID). One Serving CN Node pool refers to a group of Serving CN Nodes which manage a group of Radio Access Networks (RANs) jointly, and when a mobile terminal moves in the RANs managed by the Serving CN Node pool, the Serving CN Nodes remain unchanged. One Serving CN Node pool also manages a group of tracking areas, and each tracking area corresponds to one Tracking Area ID (TAI), and the TAI is unique in the whole Public Land Mobile Network (PLMN). The Pool ID can be a TAI managed by the Pool ID, and also can be an identifier independent from the tracking area ID. The Pool ID and PLMN ID can constitute a domain name of a certain Serving CN Node pool, which uniquely identifies the Serving CN Node pool.

When receiving a Non-Access Stratum (NAS) message sent from a mobile terminal in idle state, the radio access network unit checks whether identifier information is carried in the message, and the identifier information includes: a PLMN ID, a Pool ID and an MME ID, and the following different treatments are adopted according to different validity conditions of the identifier information.

①. If the PLMN ID, Pool ID and MME ID received by the radio access network unit are all valid, the identifier information namely the MME ID, Pool ID and PLMN ID constitute a domain name of the Serving CN Node of the mobile terminal, which uniquely identifies the Serving CN Node. According to the domain name, the radio access network unit searches the DNS or the resource management server to acquire the IP address of the Serving CN Node, thereby communicating with the Serving CN Node to send the non-access stratum message of the mobile terminal to the Serving CN Node.

An optional method for generating domain name, in which the radio access network unit makes the MME ID, Pool ID and PLMN ID constitute the domain name of the Serving CN Node, is: domain name=MME ID.Pool ID.PLMN ID.

② If the PLMN ID and Pool ID received by the radio access network unit are valid, but the received MME ID is invalid, a domain name of the Serving CN Node pool is constructed, and the resource management server corresponding to the Serving CN Node pool which manages the radio access network unit is accessed according to the domain name, the resource management server allocates one Serving CN Node to the mobile terminal according to a load sharing principle, and the radio access network unit sends the non-access stratum message of the mobile terminal to the Serving CN Node.

The above resource management server can be an independent server, and also can be distributed in each Serving CN Node.

③ If the PLMN ID received by the radio access network unit is valid, but the received Pool ID and MME ID are invalid, firstly the Pool ID is determined according to the PLMN ID (one PLMN only has one MME Pool connected with one radio access network unit), and the domain name of the Serving CN Node pool is constructed, and the resource management server corresponding to the Serving CN Node pool is accessed according to the domain name, and the resource management server allocates the Serving CN Node, and the radio access network unit sends the non-access stratum message of the mobile terminal to the Serving CN Node.

④ If the PLMN ID, Pool ID and MME ID received by the radio access network unit are all invalid, a failure message is returned to a User Equipment (UE).

The above valid PLMN ID means that a PLMN ID value is not NULL, and the radio access network unit belongs to a public land mobile network identified by the PLMN ID; the valid Pool ID means that a Pool ID value is not NULL, and the Pool ID of the Serving CN Node pool is a Pool ID of a certain Serving CN Node pool which manages the radio access network unit, and the above PLMN ID is identical with the PLMN ID of the Serving CN Node pool corresponding to the Pool ID; the valid MME ID means that an MME ID value is not NULL, and the corresponding Pool ID is valid, and the MME ID value belongs to a Serving CN Node pool, that is, the MME ID uniquely corresponds to an MME in the Serving CN Node pool. The radio access network unit can be managed by multiple Serving CN Node pools, but the multiple Serving CN Node pools managing the same radio access network unit are mutually independent.

When the above PLMN ID is invalid, it is indicated that no interface exists (disconnected) between the PLMN requested by the mobile terminal and the radio access network unit, thus the radio access network cannot provide the services of reaching the requested PLMN for the mobile terminal.

When the above PLMN ID is valid, but the Pool ID is invalid, it is indicated that the mobile terminal has a movement across the Serving CN Node pools after the last registration, and the radio access network unit is unable to associate with (disconnected) the Serving CN Node registered by the mobile terminal last time, and at this point, the radio access network unit must reallocate the Serving CN Node for the mobile terminal.

When the above PLMN ID is valid, but the MME ID is invalid, it is indicated that the mobile terminal did not successfully register in the network before, or the network configuration is changed, or the abnormality occurs in the network, and at this point, the radio access network unit is required to allocate a new Serving CN Node to the mobile terminal.

Only when the PLMN ID, Pool ID and MME ID are all valid, the radio access network unit can directly send the non-access stratum message to the Serving CN Node corresponding to the identifier information, and it is not required to allocate a new Serving CN Node.

When judging whether the identifier information is valid, the radio access network unit can firstly search for the Serving CN Node according to the PLMN ID, Pool ID and MME ID, if the searching fails, it is indicated that certain parts of the identifier information are invalid (e.g., the MME ID is invalid), and a new Serving CN Node is required to be allocated at this point; if the address of the Serving CN Node is obtained through searching, the radio access network unit can further judge whether the Serving CN Node is connected with the radio access network unit according to the PLMN ID value and the Pool ID value.

After the mobile terminal registers in the Serving CN Node successfully, the MME ID of the Serving CN Node, the Pool ID of the Serving CN Node pool in which the Serving CN Node is located and the PLMN ID of the corresponding public land mobile network are sent to the mobile terminal through a response message sent by the Serving CN Node to the mobile terminal, so that the mobile terminal carries the latest MME ID, Pool ID and PLMN ID to the radio access network unit when initiating a new service request next time, and the radio access network unit is able to find the Serving CN Node where the mobile terminal registers.

The non-access stratum message is a message between the mobile terminal and the Serving CN Node, and an access message is a message between the UE and the radio access network unit. Between the radio access network unit and the UE, the non-access stratum message is also transmitted through the access message. In order to eliminate the trouble of the radio access network unit decoding the non-access stratum message, the MME ID, Pool ID and PLMN ID are carried in the access message to be transmitted.

First Example

Figure 2:
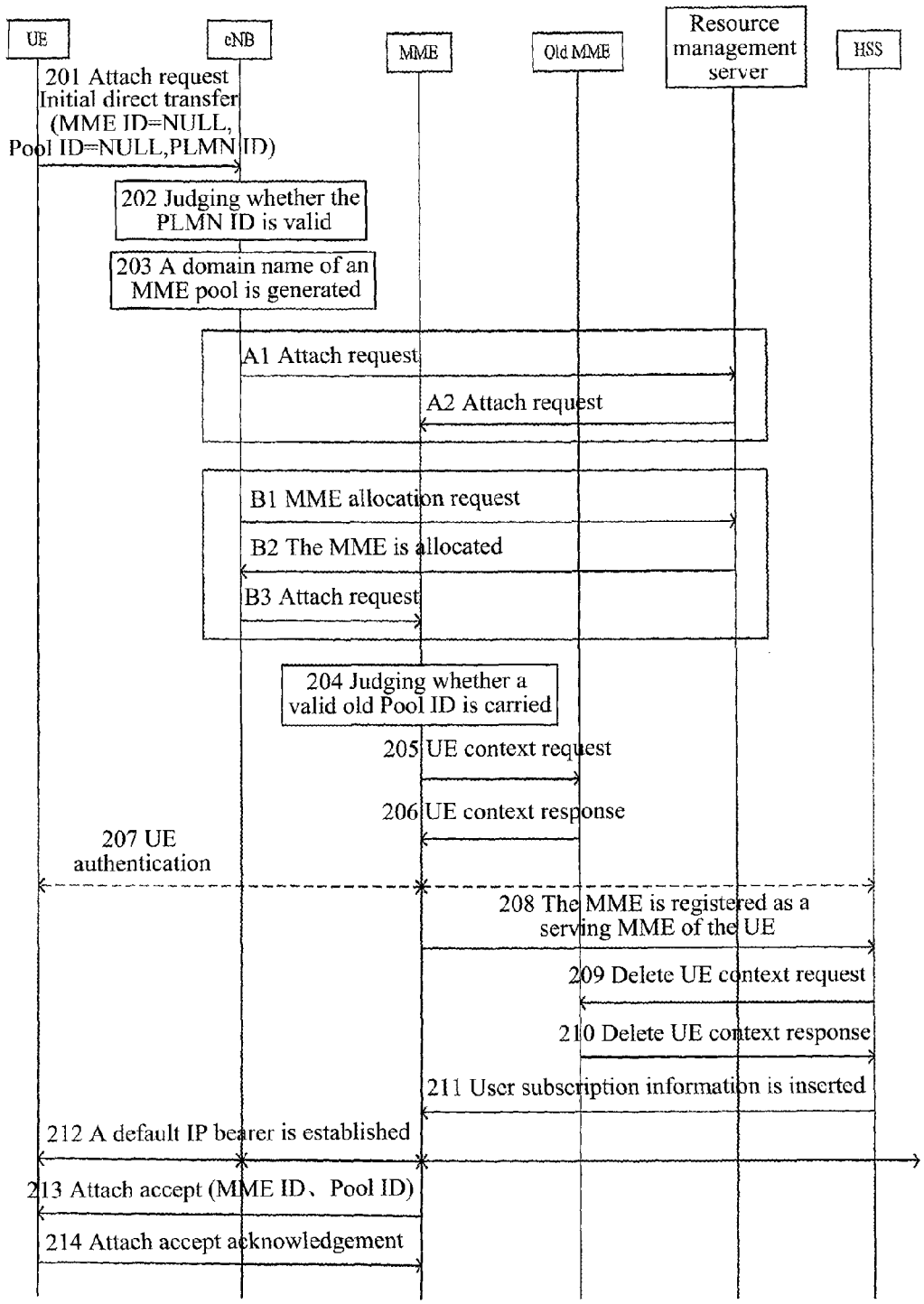
FIG. 2 is a flow chart of the first example of the present invention.

As shown in FIG. 2, the example is a flow of a mobile terminal registering in the network for the first time. The example is applied to the System Architecture Evolution (SAE), compared with FIG. 1, a Mobility Management Entity (MME) in FIG. 2 corresponds to a Serving CN Node in FIG. 1, an evolved Node B (eNB) corresponds to a radio access network unit in FIG. 1, and a User Equipment (UE) corresponds to a mobile terminal in FIG. 1.

The registration flow includes the following steps.

In step 201, an attach request message of the UE is transmitted through an initial direct transfer message of a Radio Resource Control (RRC) message between the UE and the eNB, the initial direct transfer message includes the attach request message (a non-access stratum message) between the UE and the MME and identifier information of UE during the last registration, and the identifier information includes: a Mobility Management Entity Identifier (MME ID), a Serving CN Node pool identifier (Pool ID) and a Public Land Mobile Network Identifier (PLMN ID).

Since the UE registers in the network for the first time when sending the attach request message, the UE sets the MME ID and Pool ID in the initial direct transfer message as NULL, namely invalid, and the PLMN ID is set as a PLMN ID of a network selected by the UE; in the non-access stratum message (attach request message), the UE carries the MME ID of the MME in which the UE is located during the last registration, Pool ID and PLMN ID, and alternatively, the UE also can carry a Tracking Area ID (TAI) in which the UE is located during the last registration.

In step 202, after receiving the initial direct transfer message, the eNB analyzes the identifier information and judges whether the PLMN ID in the identifier information is valid, if yes, the next step is executed, otherwise the eNB directly returns a failure response to the UE, and the registration process ends.

In step 203, if the eNB determines that the PLMN ID is valid, and the MME ID and Pool ID are invalid, the eNB selects an MME pool corresponding to the PLMN for the UE according to the PLMN ID, and decides the Pool ID of the MME pool be connected (POOL ID corresponding to each MME pool and its PLMN ID are configured in the eNB), and a domain name of the MME pool is generated, such as Pool ID.PLMN ID, and the eNB accesses a resource management server corresponding to this MME pool according to the domain name, and the resource management server corresponding to the MME pool allocates the MME to the UE according to a load sharing principle.

The following two methods can be used for allocating the MME, as shown by dashed boxes a and b in the figure.

The First Method

In step A1, the eNB sends the attach request message sent from the UE to the resource management server corresponding to the generated domain name.

In step A2, the resource management server allocates the MME to the UE according to the load sharing principle, and forwards the attach request message to the allocated MME, that is, the attach request message is directly sent to the MME by the resource management server.

The resource management server can be one or multiple independent servers, and the function also can be distributed into all MMEs in the MME pool. If the allocated MME is the resource management server itself, the step A2 is not required to be executed.

The Second Method

In step B1, the eNB requests the resource management server to allocate the MME according to the generated domain name.

In step B2, the resource management server allocates the MME to the UE according to the load sharing principle.

At this point, the resource management server can be one or multiple independent servers, and functions of the server can be integrated in a Domain Name Server (DNS).

In step B3, the eNB forwards the attach request message received from the UE to the MME allocated by the resource management server.

When forwarding the message to the MME, the eNB firstly searches for the IP address of the MME, and then forwards the message to the MME.

In step 204, after receiving the attach request message, the MME judges whether a valid old Pool ID (or old TAI) and old MME ID are carried in the attach request message, if yes, the next step is executed, otherwise proceed to step 207.

In step 205, the MME analyzes a domain name of an old MME in which the UE is located during the last registration according to the old Pool ID (or old TAI) and old MME ID carried in the attach request message, and the IP address of the old MME is analyzed and obtained through the DNS according to the domain name, and a request for transmitting a UE context message is sent to the old MME, and the UE context message includes user information such as a user key and subscription attributes and so on.

Since one MME Pool manages a group of TAs, and the TAs are globally unique, when the TAs of two MME pools are not overlapped, the TAI can be used to identify the MME pool.

In step 206, the old MME sends the UE context message to the current MME.

In step 207, the MME decides whether it is required to perform authentication on a user as needed (for example, if the user is a new user, or the last authentication will expire soon), if yes, the MME performs authentication on the UE and executes the next step, otherwise the next step is directly executed.

In step 208, the MME registers to a Home Subscriber Server (HSS) for serving the UE by the MME itself.

In step 209, after receiving a registration message of the MME, the HSS sends a command of deleting the user context message to the old MME.

In step 210, the old MME deletes the user context or identifies the user context as inexistent.

In step 211, the HSS inserts user subscription information to the MME.

In step 212, a default IP bearer is established under the control of the MME (that is, an IP is allocated and a connection is established).

The step also needs the participation of a core network user plane unit, which is not within the discussion scope of the present invention and will not be described repeatedly.

In step 213, the MME sends a registration acknowledgement message (or called as an attach accept message) to the UE, if the Serving CN Node decides that the MME ID has changed (that is, the new MME ID is inconsistent with the MME ID in the non-access stratum message sent by the mobile terminal), the Serving CN Node carries the latest identifier information (i.e. the identifier information of the serving CN Node), including the MME ID and Pool ID, or also including the PLMN ID, in the acknowledgement message, In step 214, after receiving the registration acknowledgement message, the UE saves the identifier information therein, and returns a registration success acknowledgement (or called as an attach accept acknowledgement message) to the MME.

The UE saves the identifier information therein, so that it can route the non-access stratum message to the MME correctly during the next accessing.

The Second Example

Figure 3:
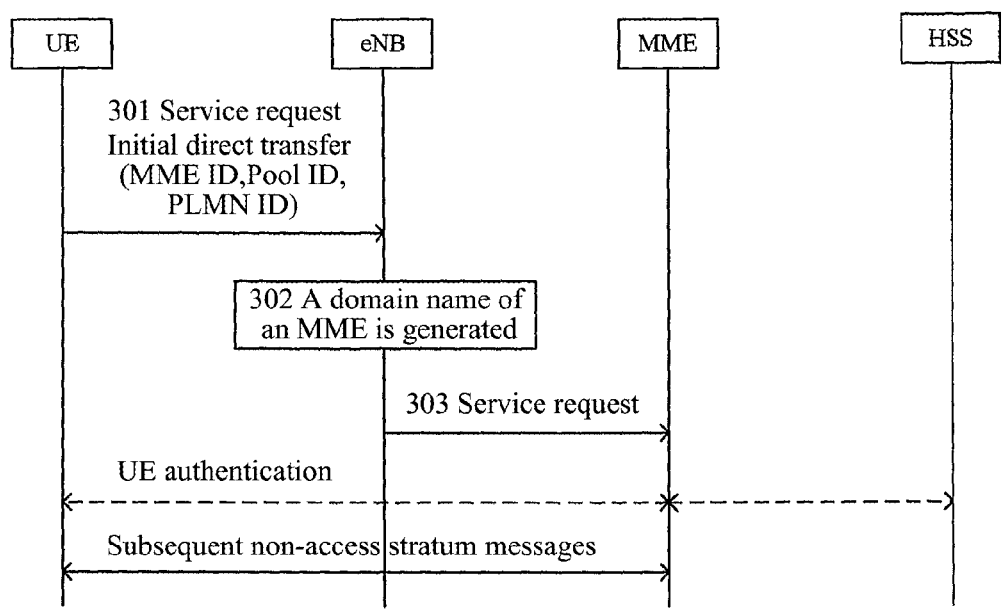
FIG. 3 is a flow chart of the second example of the present invention.

As shown in FIG. 3, the example is a flow of activating a certain service in an idle state when a mobile terminal stays within the scope of radio access networks managed by the same MME pool. In the flow, a UE has saved a valid MME ID and a valid Pool ID before initiating a service request. The steps of the flow are described as follows.

In step 301, a service request message of the UE is transmitted through an initial direct transfer message of an RRC message between the UE and an eNB, and the initial direct transfer message includes the service request message (a non-access stratum message) and identifier information of UE during the last registration, and the identifier information includes: an MME ID, a Pool ID and a PLMN ID.

Carrying the identifier information in the initial direct transfer message is to make the eNB search for a path without analyzing the non-access stratum message (i.e. the service request here).

In step 302, after receiving the initial direct transfer message, if the eNB analyzes and obtains the identifier information, and determines that the Pool ID in the identifier information is an ID of a certain MME pool connected with the eNB, and the MME pool belongs to a PLMN specified by the PLMN ID, and the MME ID is not NULL, the eNB constitutes a domain name of MME according to the PLMN ID, Pool ID and MME ID, such as MME ID.Pool ID.PLMN ID.

In step 303, the eNB finds the MME according to the above domain name (the domain name is converted to an IP address and the MME is located), and an association is established between the UE and the MME (for example, RRC is bound with the signaling link between MME and eNB), and the service request message of the UE is sent to the MME.

After receiving the service request message, the MME performs authentication on the UE as needed. The subsequent non-access stratum messages are directly forwarded between the MME and the UE, and the eNB is not required to re-analyze the domain name.

The Third Example

Figure 4:
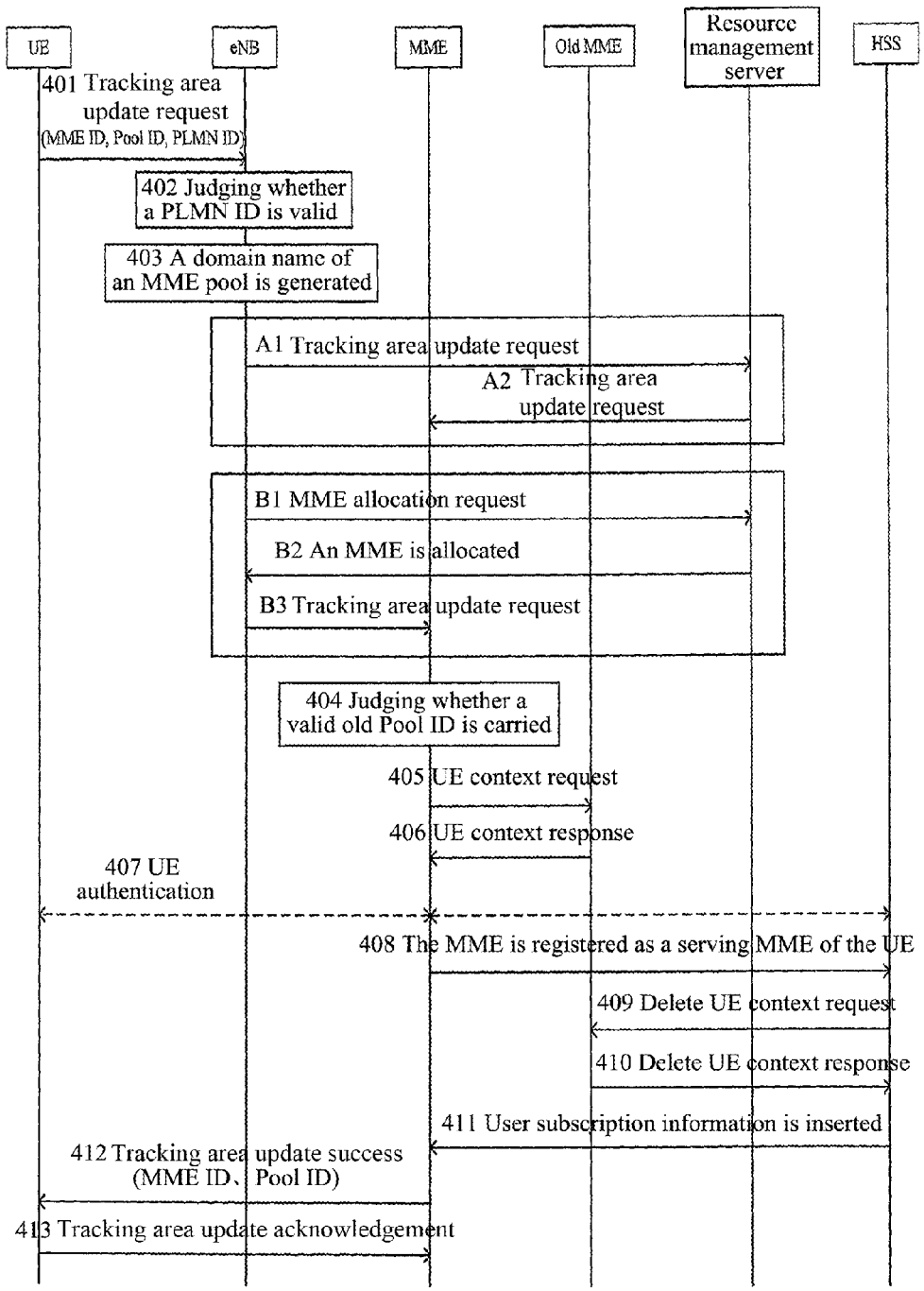
FIG. 4 is a flow chart of the third example of the present invention.

As shown in FIG. 4, the example is a flow of tracking area update when a mobile terminal in an idle state moves to the scope of radio access networks managed by another MME pool. In the flow, since the Pool ID saved in the UE is not the Pool ID of the MME pool to be accessed currently, the Pool ID and MME ID saved in the UE are invalid. The steps of the flow are described as follows.

In step 401, when detecting that a tracking area is changed (no intersection exists between a tracking area list broadcasted by a cell and a tracking area list saved by the UE), the UE sends a tracking area update request message, and the tracking area update request message of the UE is transmitted through an initial direct transfer message of an RRC message between the UE and an eNB, and the initial direct transfer message includes the tracking area update request message (a non-access stratum message) and identifier information of UE during the last registration, and the identifier information includes: an MME ID, a Pool ID and a PLMN ID.

The tracking area update request message is sent to an MME, and the message is required to be sent to the eNB through the initial direct transfer message of the RRC message between the UE and the eNB.

In step 402, after receiving the initial direct transfer message, the eNB analyzes the identifier information and judges whether the PLMN ID in the identifier information is valid, if yes, the next step is executed, otherwise the eNB directly returns a failure response to the UE, and the registration process ends.

In step 403, the eNB determines that the PLMN ID is valid, and the MME ID and Pool ID are invalid, and the Pool ID of an MME pool be connected is decided according to the PLMN ID, and a domain name is generated, such as Pool ID.PLMN ID, the eNB accesses a resource management server corresponding to the MME pool according to the domain name, and the resource management server allocates one MME to the UE according to a load sharing principle.

In the example, the Pool ID in the identifier information within the initial direct transfer message sent by the UE is different from the Pool ID managing the eNB in the same PLMN, and the MME pool is changed, though the MME ID and Pool ID are not NULL at this point, they are still invalid, and it is required to reallocate the MME.

There are following two methods for allocating the MME, as shown by dashed boxes a and b in the figure.

The First Method

In step A1, the eNB sends the tracking area update request message sent from the UE to the resource management server corresponding to the generated domain name.

In step A2, the resource management server allocates the MME to the UE according to the load sharing principle, and forwards the tracking area update request message to the allocated MME.

The resource management server can be one or multiple independent servers, and the function also can be distributed in all MMEs in the MME pool. If the allocated MME is the resource management server itself, the step A2 is not required to be executed.

The Second Method

In step B1, the eNB requests the resource management server to allocate the MME according to the generated domain name.

In step B2, the resource management server allocates the MME to the UE according to the load sharing principle.

At this point, the resource management server can be one or multiple independent servers, and functions of the server can be integrated in a Domain Name Server (DNS).

In step B3, the eNB forwards the tracking area update request message received from the UE to the MME allocated by the resource management server.

When forwarding the message to the MME, the eNB firstly searches for the IP address of the MME in a centralization control unit, and then forwards the message.

In step 404, after receiving the tracking area update request message, the MME judges whether a valid old Pool ID (or old TAI) and old MME ID are carried in the tracking area update request message, if yes, the next step is executed, otherwise step 407 is executed.

In step 405, the MME analyzes the IP address of an old MME in which the UE is located during the last registration according to the old Pool ID (or old TAI) and old MME ID carried in the tracking area update request message, and sends a request for transmitting a UE context message to the old MME.

In step 406, the old MME sends the UE context message to the current MME, and the UE context message includes user information such as a user key and subscription attributes and so on.

In step 407, the MME decides whether it is required to perform authentication on a user as needed (for example, if the user is a new user, or the last authentication will expire soon), if yes, a new MME performs authentication on the UE and the next step is executed, otherwise the next step is directly executed.

In step 408, the MME registers to an HSS for serving the UE by the MME itself.

In step 409, after receiving a registration message of the MME, the HSS sends a command of deleting the user context to the old MME.

In step 410, the old MME deletes the user context or identifies the user context as inexistent.

In step 411, the HSS inserts user subscription information to the MME.

In step 412, the MME sends a tracking area update acceptance message to the UE, and carries the new identifier information, including the MME ID and Pool ID, or also including the PLMN ID, in the message.

In step 413, after receiving the tracking area update acceptance message, the UE saves the identifier information therein, and acknowledges a tracking area update success to the MME.

The UE saves the identifier information therein, so that it can route the non-access stratum message to the MME correctly during the next accessing.

INDUSTRIAL APPLICABILITY

With the mobile terminal registration method in the network composed of multiple radio access network units and multiple Serving CN Nodes provided in the present document, based on the all IP architecture, the scheme can adapt to requirements of the all IP intercommunication between a radio access system and core network nodes. A new parameter is adopted in the present invention, an identifier MME ID independent from TMSI is used to identify a Serving CN Node in the pool, and the TMSI field is not used as the identifier any more, thus the number of users managed by the pool is not limited. In addition, it can be implemented that it is not required to configure a mapping table in a radio access network unit, and the RAN searches a certain centralization control unit to acquire an IP address of the Serving CN Node, which reduces the workload of the radio access network units and saves system resources.

What is claimed is:

1. A mobile terminal registration method in a radio network, comprising following steps:
   a. a mobile terminal sending a non-access stratum message and identifier information of last registration to a radio access network unit, and the identifier information comprising a Serving CN Node identifier (Mobility Management Entity Identifier (MME ID)), a Serving CN Node pool identifier (Pool ID) and a Public Land Mobile Network Identifier (PLMN ID);
   b. if the radio access network unit determines that the identifier information is invalid, the radio access network unit allocating a Serving CN Node to the mobile terminal and sending the non-access stratum message to the Serving CN Node;
   c. after the Serving CN Node receives the non-access stratum message, if determining that the registration request of the mobile terminal can be accepted, the Serving CN Node sending a success response message to the mobile terminal which carries the identifier information of the current Serving CN Node, including the MME ID and the Pool ID, or further including the PLMN ID; and
   d. the mobile terminal saving the identifier information in the success response message after receiving the success response message.

2. The method according to claim 1, wherein, in the step a, the non-access stratum message and the identifier information of the mobile terminal are transmitted to the radio access network unit through a radio resource control message between the mobile terminal and the radio access network unit.

3. The method according to claim 1, wherein, in the step b, the identifier information being invalid means that the PLMN ID is valid, and the Pool ID or the MME ID is invalid.

4. The method according to claim 1, wherein, in the step b, the radio access network unit allocating the Serving CN Node to the mobile terminal comprises following steps: the radio access network unit accessing a resource management server corresponding to a Serving CN Node pool according to the PLMN ID requested by the mobile terminal, and the resource management server allocating the Serving CN Node to the terminal.

5. The method according to claim 4, wherein, the radio access network unit accessing the resource management server according to the PLMN ID requested by the mobile terminal comprises following steps: the radio access network unit selecting a corresponding Pool ID according to the PLMN ID requested by the mobile terminal, and generating a domain name of the Serving CN Node pool according to the Pool ID and the PLMN ID, and accessing the resource management server according to the domain name.

6. The method according to claim 5, wherein, the domain name is Pool ID.PLMN ID.

7. The method according to claim 3, wherein, a resource management server allocating the Serving CN Node to the terminal comprises one of following methods:
   the radio access network unit sending a non-access stratum message sent from a mobile terminal to the resource management server, the resource management server allocating the Serving CN Node to the mobile terminal according to a load sharing principle, and forwarding the non-access stratum message to the allocated Serving CN Node of the mobile terminal;
   or, the radio access network unit requesting the resource management server to allocate the Serving CN Node according to the domain name, and after the resource management server allocates the Serving CN Node to the mobile terminal according to the load sharing principle, the radio access network unit forwarding the non-access stratum message to the Serving CN Node allocated by the resource management server.

8. The method according to claim 1, wherein, the step c further comprises: the Serving CN Node registering to a home subscriber server; and the home subscriber server returning user subscription information to the Serving CN Node.

9. The method according to claim 1, wherein, in the step c, the Serving CN Node decides whether the registration request of the mobile terminal can be accepted according to the user subscription information.

10. The method according to claim 1, wherein, the Serving CN Node is a mobility management entity, and the radio access network unit is an evolved node B.

11. The method according to claim 1, wherein, the identifier information being valid means that the PLMN ID, the Pool ID and the MME ID are all valid; the PLMN ID being valid means that a PLMN ID value is not null, and the radio access network unit belongs to a public land mobile network identified by the PLMN ID; the Pool ID being valid means that a Pool ID value is not null, and the Pool ID is a Pool ID of a certain Serving CN Node pool which manages the radio access network unit, and the PLMN ID is identical to the PLMN ID of the Serving CN Node pool corresponding to the Pool ID; the MME ID being valid means that an MME ID value is not null, and the corresponding Pool ID is valid, and the MME ID uniquely corresponds to an MME in the Serving CN Node pool.

12. The method according to claim 1, wherein, a registration of the mobile terminal is an initial registration of the mobile terminal in a network, and the non-access stratum message is an attach request message.

13. The method according to claim 1, wherein, a registration of the mobile terminal is the registration of the mobile terminal in a network when the mobile terminal performs tracking area update, and the non-access stratum message is an tracking area update request message.

14. The method according to claim 12, wherein, when the non-access stratum message is the attach request message, in the step c, the Serving CN Node sends the success response message to the mobile terminal after establishing an IP bearer.

* * * * *